(12) United States Patent
Rattunde (10) Patent No.: US 9,138,852 B2
(45) Date of Patent: Sep. 22, 2015

(54) BRUSH-TYPE DEBURRING MACHINE

(75) Inventor: Ulrich Rattunde, Bentwisch (DE)

(73) Assignee: RATTUNDE & Co. GmbH, Ludwigslust (DE)

( * ) Notice: Subject to any disclaimer, the term of this patent is extended or adjusted under 35 U.S.C. 154(b) by 0 days.

(21) Appl. No.: 13/883,275

(22) PCT Filed: Nov. 1, 2011

(86) PCT No.: PCT/EP2011/069190
§ 371 (c)(1),
(2), (4) Date: May 2, 2013

(87) PCT Pub. No.: WO2012/059487
PCT Pub. Date: May 10, 2012

(65) Prior Publication Data
US 2013/0225048 A1 Aug. 29, 2013

(30) Foreign Application Priority Data
Nov. 5, 2010 (DE) .......................... 10 2010 050 317

(51) Int. Cl.
*B24B 9/00* (2006.01)
*B08B 1/02* (2006.01)
*B08B 1/04* (2006.01)
*B08B 9/02* (2006.01)
(Continued)

(52) U.S. Cl.
CPC . *B24B 9/002* (2013.01); *B08B 1/02* (2013.01); *B08B 1/04* (2013.01); *B08B 9/021* (2013.01); *B24B 9/005* (2013.01); *B24B 9/007* (2013.01); *B24B 41/067* (2013.01); *B65G 35/00* (2013.01)

(58) Field of Classification Search
CPC ........ B24B 7/162; B24B 9/002; B24B 9/007; B24B 41/005
USPC ......... 451/28, 178, 49, 51, 59, 182, 190, 194, 451/244, 245, 249, 385, 397, 398, 402, 332, 451/333; 198/480.1, 481.1; 269/254 CS, 61
See application file for complete search history.

(56) References Cited

U.S. PATENT DOCUMENTS 1,365,773 A * 1/1921 Dickerson ..................... 141/141
1,758,928 A * 5/1930 Burns ....................... 198/803.11
(Continued)

FOREIGN PATENT DOCUMENTS

DE 11 54 698 B 9/1963
DE 21 52 229 A1 4/1973
(Continued)

*Primary Examiner* — Monica Carter
*Assistant Examiner* — Marcel Dion
(74) *Attorney, Agent, or Firm* — Lazaris IP (57) ABSTRACT

The invention concerns a brush-type deburring machine for deburring opposed ends of at least one elongate profile formed in a longitudinal direction during conveying in a conveying direction with two rows of conveying discs arranged in the conveying direction, wherein the conveying discs are arranged opposite one another in pairs and in each case have at least one aperture corresponding to an opposite aperture for receiving the at least one elongate profile, a gripping device by which the at least one elongate profile is capable of being inserted into the mutually corresponding apertures, with a pressing device arranged between the corresponding apertures and by which a force is capable of being exerted upon the at least one elongate profile in a direction radially towards the inside with respect to the conveying discs into the corresponding apertures.

2 Claims, 6 Drawing Sheets

(51) Int. Cl.
  *B24B 41/06*  (2012.01)
  *B65G 35/00*  (2006.01)

(56) References Cited

U.S. PATENT DOCUMENTS

| | | | | |
|---|---|---|---|---|
| 1,919,639 A | * | 7/1933 | Myers | 451/65 |
| 1,957,534 A | * | 5/1934 | Gladfelter | 198/480.1 |
| 1,974,696 A | * | 9/1934 | Swanson | 451/149 |
| 2,341,825 A | * | 2/1944 | Spicacci | 451/49 |
| 2,358,854 A | * | 9/1944 | Elvin et al. | 451/182 |
| 2,386,742 A | * | 10/1945 | MacNeill | 451/182 |
| 2,795,090 A | * | 6/1957 | Sterna | 451/333 |
| 2,805,524 A | * | 9/1957 | Silven | 451/244 |
| 3,045,268 A | | 7/1962 | Coan | |
| 3,063,078 A | | 11/1962 | Strohmeier | |
| 3,112,851 A | | 12/1963 | Collins | |
| 3,311,940 A | | 4/1967 | Spittler | |
| 3,501,870 A | | 3/1970 | Bottomley | |
| 4,860,499 A | * | 8/1989 | Dinger et al. | 451/8 |
| 6,206,763 B1 | | 3/2001 | Mackall | |

FOREIGN PATENT DOCUMENTS

| | | | | |
|---|---|---|---|---|
| DE | 75 16 108 U | | 9/1975 | |
| DE | 80 16 246 U1 | | 9/1980 | |
| DE | 34 30 065 A1 | | 2/1986 | |
| DE | 195 16 607 C1 | | 5/1996 | |
| DE | 10 2010 046 392.2 | | 9/2010 | |
| GB | 1153896 A | * | 8/1966 | B24B 7/162 |
| WO | WO 2012038323 A1 | | 3/2012 | |

* cited by examiner

BRUSH-TYPE DEBURRING MACHINE

CROSS REFERENCE TO RELATED PATENT APPLICATIONS

This patent application is filed herewith for the U.S. National Stage under 35 U.S.C. §371 and claims priority to PCT application PCT/EP2011/069190, with an international filing date of Nov. 1, 2011. The contents of this application are incorporated in their entirety herein.

STATEMENT REGARDING FEDERALLY-SPONSORED RESEARCH OR DEVELOPMENT

Not applicable.

TECHNICAL FIELD

The invention relates to a brush-type deburring machine for deburring opposed ends of an elongate profile formed in the longitudinal direction according to the preamble of Claim 1 and to a method of deburring the ends of the elongate profile.

BACKGROUND OF THE INVENTION

Brush-type deburring machines are known in the prior art. As a rule, brush-type deburring machines are not used independently but in combination with pipe-cutting machines which cut sections to length from a metal pipe at a high clock time. The sections cut to length are subsequently further treated in the brush-type deburring machine by metal swarf or the like being removed from the ends of the pipe sections by means of rotating brushes.

A problem with the known brush-type deburring machines is that, in particular in the case of very short pipe sections which have a length of less than 35 mm, these pipe sections are extremely light and fall out of the brush-type deburring machine when inserted.

BRIEF SUMMARY OF THE INVENTION

The object of the invention is to provide a brush-type deburring machine and a method of brush deburring, which avoid the drawbacks specified.

The object is attained by a brush-type deburring machine specified in the introduction and by a method specified in the introduction having the features of the respective independent claims.

The brush-type deburring machine according to the invention is suitable in particular for deburring very short and light sections of an elongate profile, in particular of metal, which have been cut to length. The term "elongate profile" is to be understood as being both hollow and solid profiles, the cross-section of which can be as desired, preferably circular over the entire longitudinal extension. The elongate profiles are preferably completely of metal. The elongate profiles can be sections, i.e. sections cut to length, sawn or trimmed from still longer elongate profiles. In this case the elongate profiles can be gripped individually or simultaneously in bundles of two, three, four or more elongate profiles by means of a gripping arm and can be inserted in mutually corresponding apertures in opposed conveying discs. In order to prevent the at least one elongate profile from immediately falling out, the brush-type deburring machine according to the invention has a pressing device which is arranged between the corresponding apertures in the opposed conveying discs and by which a force is capable of being exerted upon the at least one elongate profile in a direction radially towards the inside with respect to the conveying discs into the corresponding apertures. The at least one elongate profile is prevented by the pressing device from falling out of the two corresponding apertures immediately after it has been inserted. The pressing device presses the elongate profile or the bundle of elongate profiles respectively against the radially innermost wall of the aperture. After insertion, the elongate profile rests without play in the aperture.

The pressing device exerts upon the elongate profile a force which is directed towards the ground, i.e. which is directed along the force of gravity.

It is preferable for the pressing device to have a spring which is made elongate in the conveying direction and the end of which facing away from the corresponding apertures is arranged fixed in position on a frame of the brush-type deburring machine and the free end of which facing the corresponding apertures rests radially on the outside on the at least one elongate profile so as to exert force radially towards the inside. In this particularly preferred embodiment of the invention the pressing device is designed in a particularly simple manner which thus requires little maintenance and is virtually maintenance-free. The pressing device essentially comprises a resilient steel spring which is curved in a slightly corrugated manner and the end of which fixed in position is wound up in the shape of a spiral. Part of the spring force also results from this spiral winding. The free end of the spring extends vertical downwards to the ground.

It is preferable for the free end of the spring to be situated between the two rows of conveying discs. The free end is capable of being lifted by means of the elongate profile gripped by the gripping device, by the elongate profile engaging behind the free end and the gripping device performing a movement in a direction radially towards the outside and the free end of the spring thus being lifted radially towards the outside. The "ingenuity" of this embodiment is the particularly simple design of the pressing device which is essentially a curved wire.

With respect to the method, the object is attained by the features of Claim 3, in that the at least one elongate profile is gripped by the gripping device and is inserted in the mutually corresponding apertures and the pressing device arranged between the corresponding apertures exerts a force upon the at least one elongate profile in a direction radially towards the inside with respect to the conveying discs into the corresponding apertures. In this case the force is effective towards the ground along the force of gravity. The elongate profile can thus be moved forwards by the rotation of the conveying discs overhead about—i.e. above, that is facing away from the ground—the axis of rotation of the conveying discs. The elongate profile is situated in the aperture and is additionally pressed into the aperture from above.

It is preferable for the at least one elongate profile gripped by the gripping device to engage behind the free end of the spring during a movement radially towards the outside and, as a result, to stress the spring additionally slightly further, and then to insert the at least one elongate profile in the two mutually corresponding apertures, as a result of which the free end of the spring automatically exerts a force radially towards the inside from radially on the outside, which presses the at least one elongate profile into the two apertures.

BRIEF DESCRIPTION OF THE SEVERAL VIEWS OF THE DRAWINGS

The invention is described in six figures with reference to an embodiment. In the drawings:

FIG. 2a is a side view of FIG. 1a;

DETAILED DESCRIPTION OF THE INVENTION

Figure 1A:
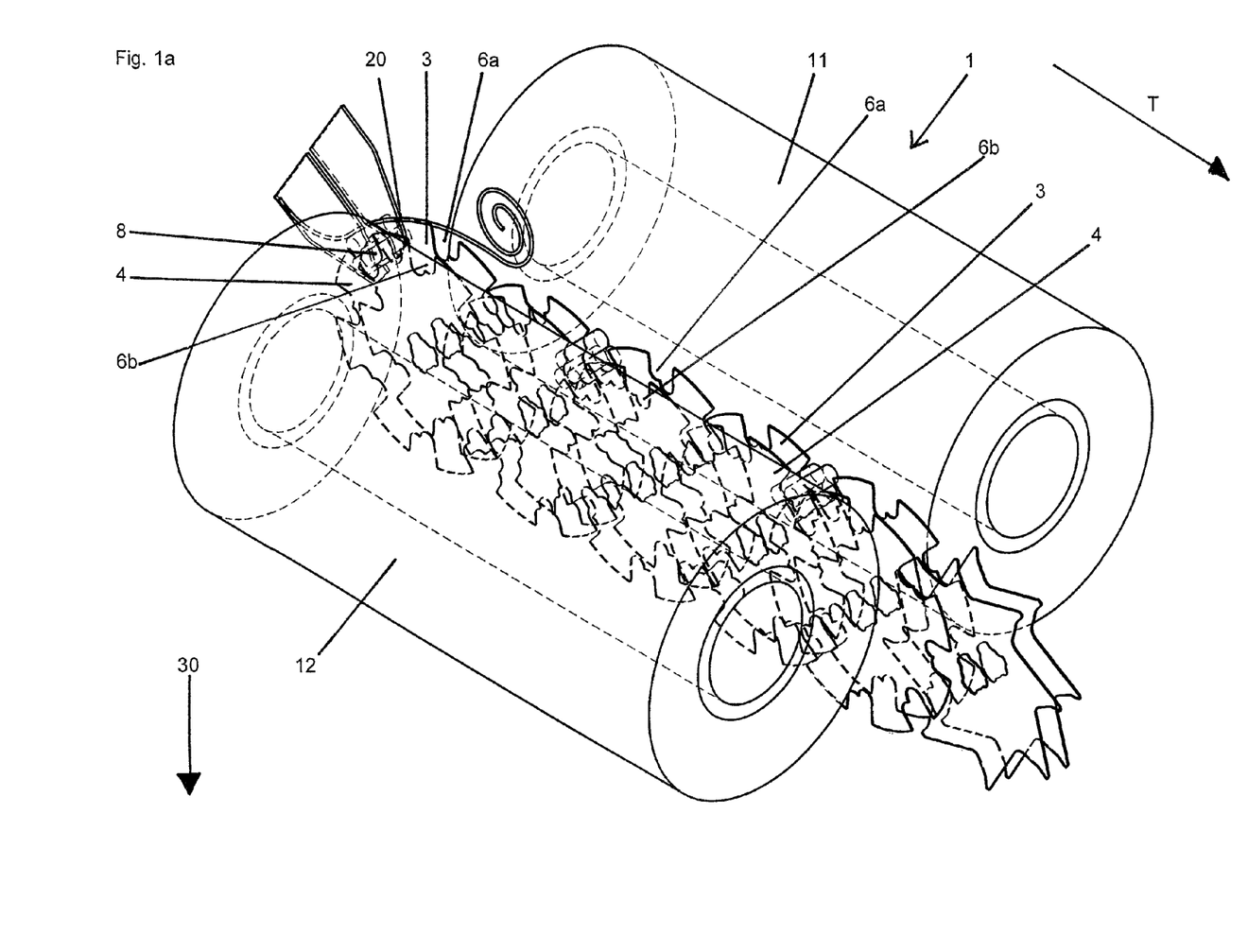
FIG. 1a shows the insertion of a pipe section cut to length into the brush-type deburring machine according to the invention.

FIG. 1a shows the brush-type deburring machine 1 according to the invention with a first and a second row of conveying discs 3, 4 arranged offset one in the other. Each row of the conveying discs 3, 4 is arranged so as to be rotatable in each case in a frame arm (not shown). The conveying discs 3, 4 are arranged opposite one another and have apertures 6a, 6b corresponding to each other. The two apertures 6a, 6b corresponding to each other in each case make it possible to convey bundles 8 of pipe sections cut to length in the conveying direction T. During the conveying of the bundles 8 of pipe sections cut to length, the two ends—projecting beyond the conveying discs 3, 4—of the three pipe sections of each bundle 8 which have been cut to length are deburred by two brush rollers 11, 12 orientated in the conveying direction T.

In particular, when the bundles 8 of pipe sections cut to length are inserted in the mutually corresponding apertures 6a, 6b of the conveying discs 3, 4, the pipe sections cut to length—in particular the radially outermost one thereof—easily fall out of the apertures 6a, 6b again. In order to prevent the pipe sections of the bundles 8 cut to length from falling out of the apertures 6a, 6b during the insertion, a steel spring 20 is provided which is under pre-tensioning and is likewise orientated in the conveying direction T and which is fastened fixed in position with an end 21 leading in the conveying direction T on a frame (not shown) and which at a free end 23 trailing in the conveying direction T presses under pre-tensioning from radially on the outside against the bundle 8 just inserted in the two corresponding apertures 6a, 6b and, as a result, holds the pipe sections fixed in the two apertures 6a, 6b corresponding to each other. The steel spring 20 is arranged in such a way that the pipe section 8 rests in the apertures 6a, 6b and is additionally pressed into the apertures 6a, 6b and touches the radially innermost wall of the aperture. The pipe section 8 is thus held without play in the aperture 6a, 6b. The pipe section 8 is conveyed forwards by the two rows of conveying discs 3, 4 above the axes of rotation of the conveying discs 3, 4. Without the steel spring 20 the pipe sections 8 would rest inside the apertures 6a, 6b during the conveying and not fall out.

The steel spring 20 is produced from resilient steel and has a curved shape in the conveying direction T.

Figure 1B:
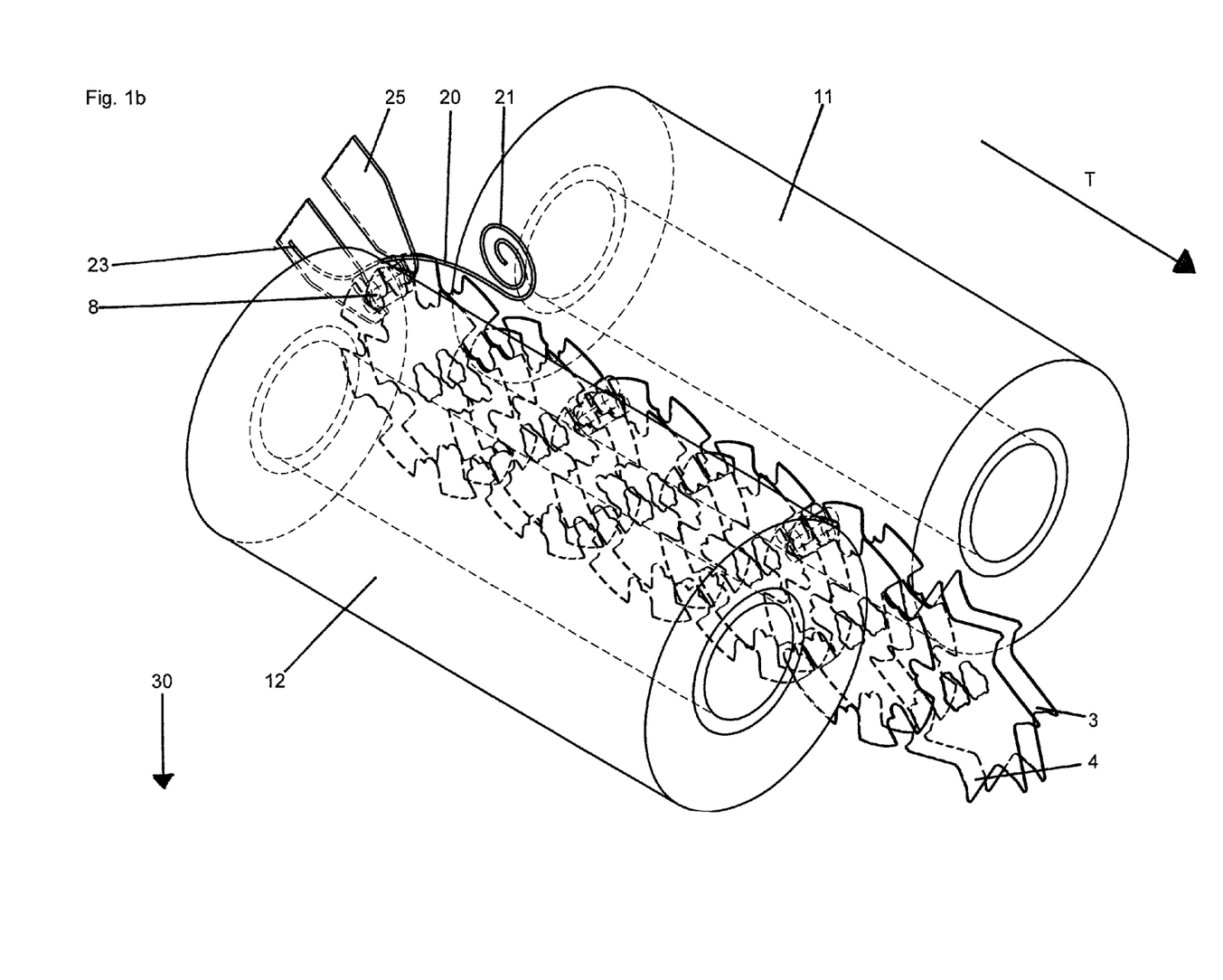
FIG. 1b shows the opening of the gripping arm.

The bundle 8 comprising three pipe sections cut to length is inserted into two mutually corresponding apertures 6a, 6b in the first two conveying discs 3, 4 by means of a gripping arm 25. In this case the gripping arm 25 performs a movement from the ground 30 below the free end 23 upwards from below and in this case presses the free end 23 of the spring 20 upwards by means of the bundle 8. The bundle 8 is subsequently inserted below the raised spring 20 into the two apertures 6a, 6b. This state is shown in FIG. 1a. In a following method step the gripping arm 25 opens the two jaws thereof and releases the bundle 8. The free end 23 of the steel spring 20 automatically presses radially towards the inside from radially on the outside and in this case holds the bundle 8 in a fixed manner under the action of force in the two mutually corresponding apertures 6a, 6b.

Figure 1C:
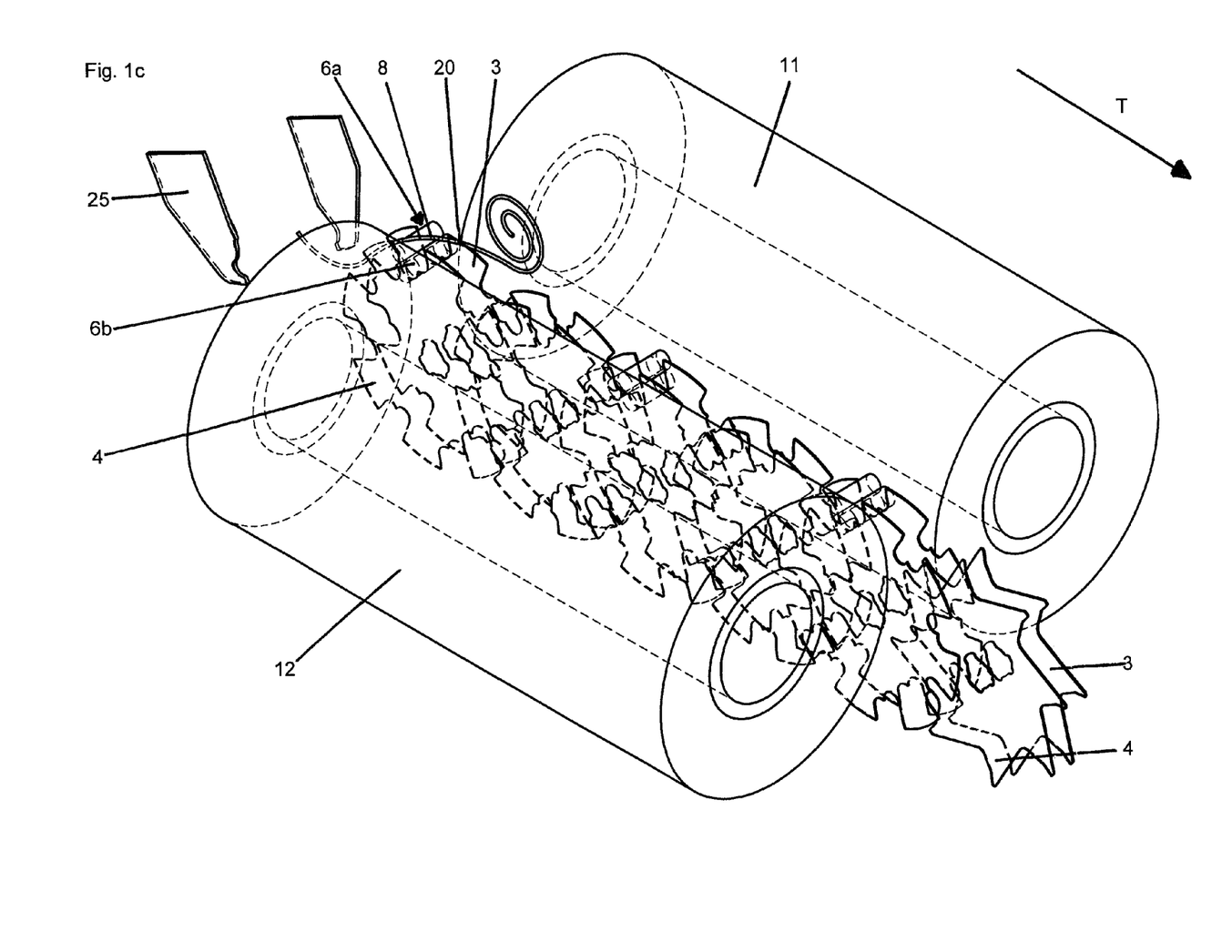
FIG. 1c shows the conveying of the pipe sections cut to length along the conveying direction by means of the conveying discs.

FIG. 1c shows a further method step in which the bundle 8 of the pipe sections has meanwhile been conveyed forward slightly in the conveying direction T and the gripping arm 25 has already moved away from the inserted bundle 8 in order to grip a new bundle (not shown) and to insert it into a pair of corresponding apertures 6a, 6b—trailing in the direction of rotation of the conveying discs 3, 4—in the first two conveying discs 3, 4 in the conveying direction T.

FIGS. 1a, 1b and 1c show method steps following in succession in this sequence.

Figure 2A:
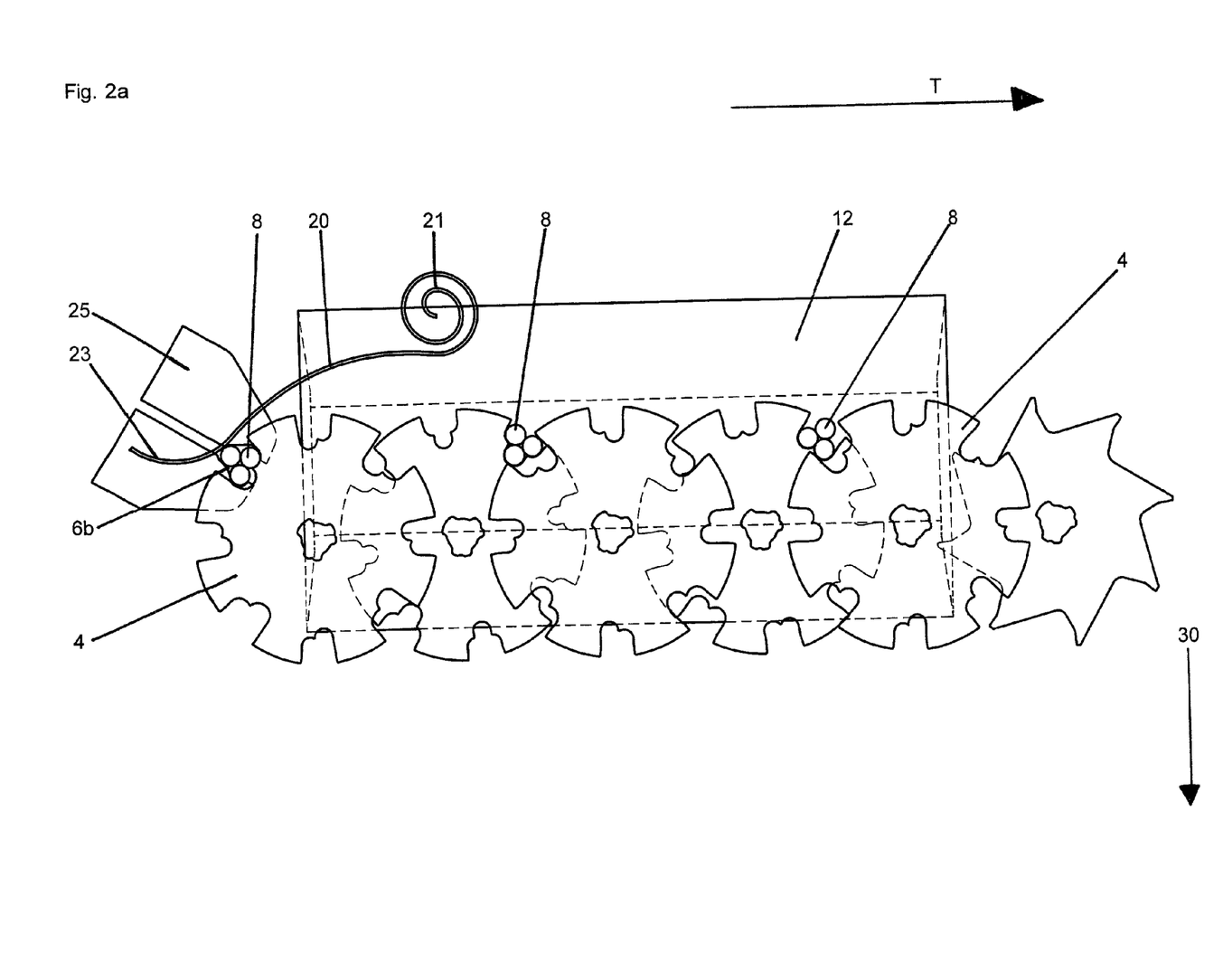

FIG. 2a is a side view, partly as a section of FIG. 1a. The gripping arm 25 engages in each case around three pipe sections which form the bundle 8. The bundle 8 has already first of all lifted the free trailing end 23 of the spring 20 slightly by a continuous movement upwards from the ground 30 and a little in the conveying direction T and then down again towards the ground 30 and has inserted the bundle 8 into the two mutually corresponding apertures 6a, 6b and in this case has slightly lowered the free end 23 again.

Figure 2B:
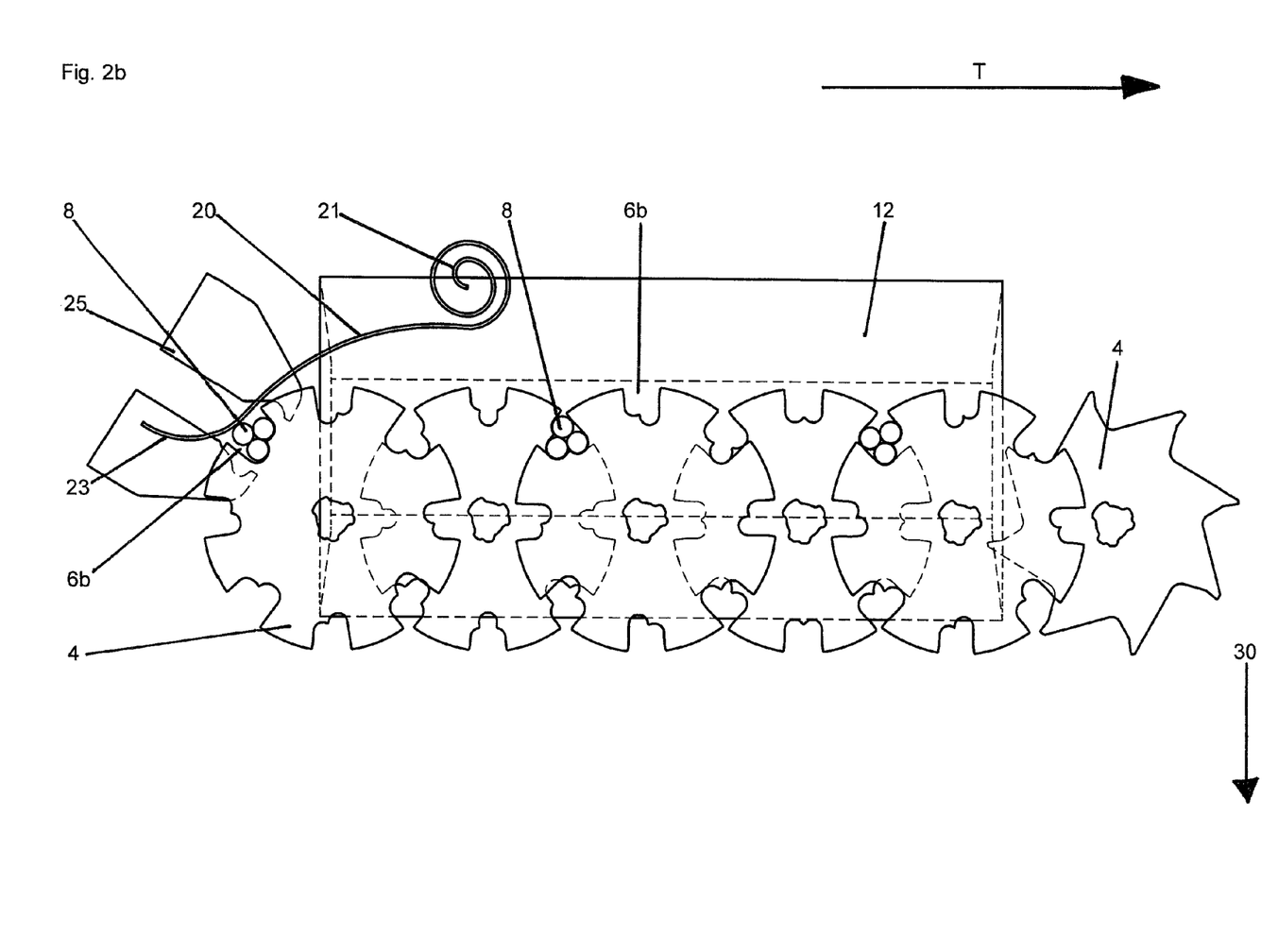
FIG. 2b is a side view of FIG. 1b.
Figure 2C:
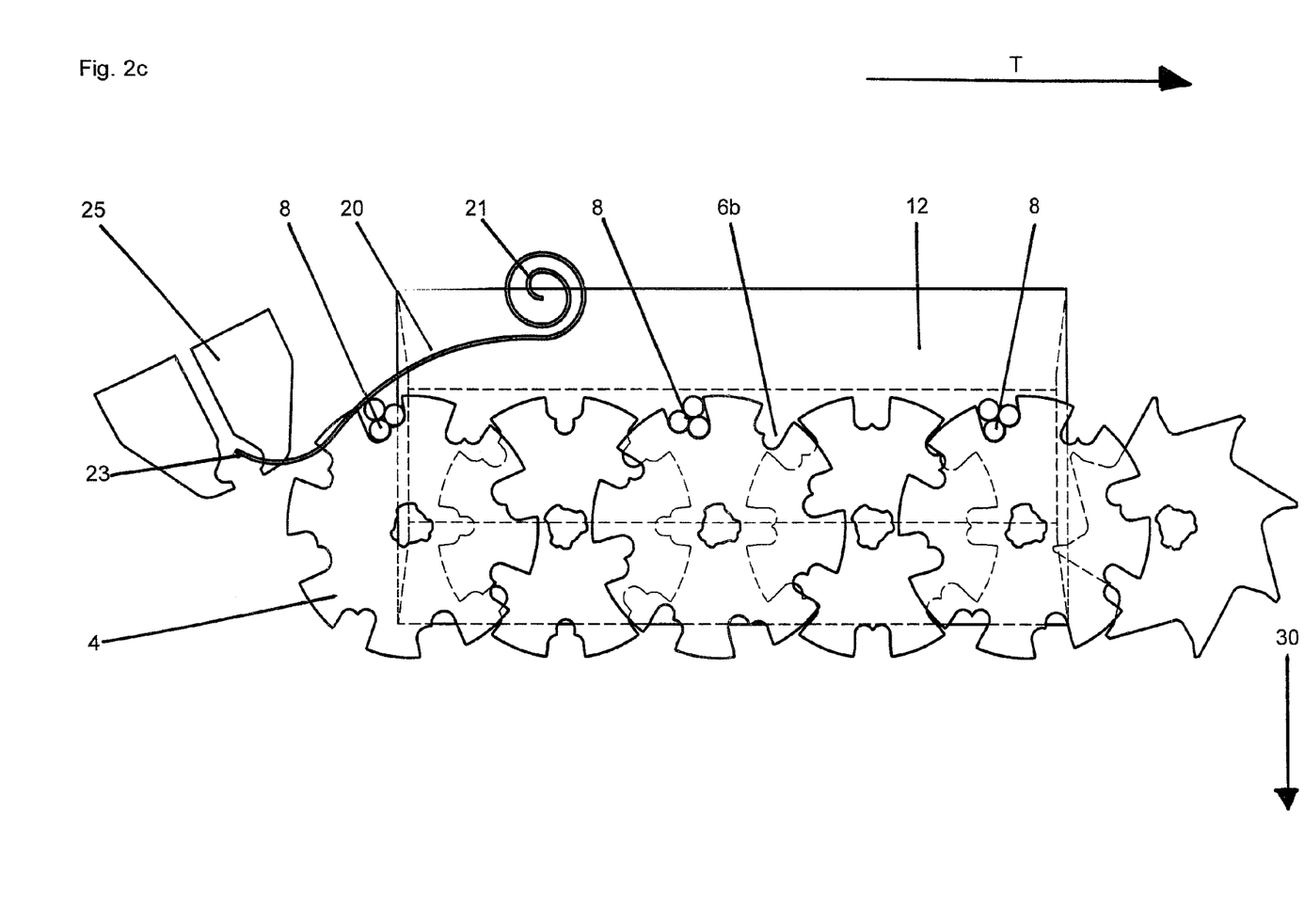
FIG. 2c is a side view of FIG. 1c.

In addition, FIGS. 2a, 2b, 2c show two bundles 8—of three pipe sections in each case—which are conveyed further forwards.

In FIG. 2b the free end 23 of the steel spring 20 exerts a radial force upon the bundle 8 and, as a result, presses each of the pipe sections, in particular the radially outer pipe section cut to length, into the two mutually corresponding apertures 6a, 6b and, in this way, prevents the pipe sections from automatically falling out of the two apertures 6a, 6b of the opposed first conveying discs 3, 4.

FIG. 2b shows a method step which follows FIG. 2a and in which the gripping arm 25 has released the bundle 8 of the three pipe sections and the free end 23 of the spring 20 exerts a force upon the bundle 8 in a direction radially towards the inside.

FIG. 2c shows the inserted bundle 8 which has already been conveyed forwards a little in the conveying direction T. In addition, the other bundles 8 are conveyed forwards to the same degree as the inserted bundle by the rotation of the conveying discs 3, 4. All the conveying discs 3, 4 rotate continuously and at the same rotational speed. During the conveying in the conveying direction T the ends of the pipe sections cut to length are deburred by means of the two opposed rotating brush rollers 11, 12.

LIST OF REFERENCES 1 brush-type deburring machine
3 conveying disc
4 conveying disc
6a aperture
6b aperture
8 bundle of pipe sections
11 brush roller
12 brush roller
20 steel spring
21 end of the steel spring fixed in position
23 free end of the steel spring
25 gripping arm
30 ground
T conveying direction

What is claimed is:

1. A method of deburring opposed ends of at least one elongate profile in a brush-type deburring machine, in which the at least one elongate profile is formed in a longitudinal direction during conveying in a conveying direction, with two rows of conveying discs arranged in the conveying direction opposite one another in pairs and in each case having at least one aperture corresponding to an opposite aperture for receiving the at least one elongate profile, and in which a spring is arranged between the corresponding apertures with one end fixed in position on a frame and a free end resting radially on an outside on the at least one elongate profile, the method comprising:

- gripping the at least one elongate profile by a gripper device;
- engaging the at least one elongate profile behind the free end of the spring during a movement radially towards the outside to stress the spring slightly further and exert pressure to raise the free end of the spring upwards;
- inserting the at least one elongate profile subsequently into the corresponding apertures below the raised free end of the spring;
- exerting a force upon the at least one elongate profile in a direction radially towards an inside with respect to the conveying discs into the corresponding apertures to prevent the at least one elongate profile from falling out of the two corresponding apertures immediately after it has been inserted below the raised free end of the spring; and
- deburring the opposed ends of the at least one elongate profile during conveying in the conveying direction.

2. The method according to claim 1, wherein the free end of the spring is situated between the two rows of conveying discs.

* * * * *